United States Patent [19]

Dabney et al.

[11] Patent Number: 5,109,345
[45] Date of Patent: Apr. 28, 1992

[54] CLOSED-LOOP AUTONOMOUS DOCKING SYSTEM

[75] Inventors: Richard W. Dabney, Toney; Richard T. Howard, Huntsville, both of Ala.

[73] Assignee: The United States of America as represented by the Administrator of the National Aeronautics and Space Administration, Washington, D.C.

[21] Appl. No.: 481,537

[22] Filed: Feb. 20, 1990

[51] Int. Cl.$^5$ .............................................. B64G 1/64
[52] U.S. Cl. .................................... 364/459; 358/103; 244/161
[58] Field of Search ............... 364/455, 459; 358/103, 358/109, 107; 244/158 R, 160, 161, 162, 171, 172

[56] References Cited

U.S. PATENT DOCUMENTS

| | | | |
|---|---|---|---|
| 4,834,531 | 5/1989 | Ward | 244/161 |
| 4,860,975 | 8/1989 | Schliesing et al. | 244/161 |
| 4,898,349 | 2/1990 | Miller | 244/161 |

Primary Examiner—Gary Chin
Attorney, Agent, or Firm—Robert L. Broad, Jr.; Jerry L. Seemann; John R. Manning

[57] ABSTRACT

An autonomous docking system is provided which produces commands for the steering and propulsion system of a chase vehicle used in the docking of that chase vehicle with a target vehicle. The docking system comprises a passive optical target affixed to the target vehicle and comprising three reflective areas including a central area mounted on a short post, and tracking sensor and process controller apparatus carried by the chase vehicle. The latter apparatus comprises a laser diode array for illuminating the target so as to cause light to be reflected from the reflective areas of the target; a sensor for detecting the light reflected from the target and for producing an electrical output signal in accordance with an image of the reflected light; a signal processor for processing the electrical output signal and for producing, based thereon, output signals relating to the relative range, roll, pitch, yaw, azimuth and elevation of the chase and target vehicles; and a docking process controller, responsive to the output signals produced by the signal processor, for producing command signals for controlling the steering and propulsion system of the chase vehicle.

18 Claims, 4 Drawing Sheets

CLOSED-LOOP AUTONOMOUS DOCKING SYSTEM

ORIGIN OF THE INVENTION

The invention described herein was made by an employee(s) of the United States Government and may be manufactured and used by or for the Government for Government purposes without the payment of any royalties thereon or therefor.

CROSS REFERENCES TO RELATED APPLICATION

This application discloses subject matter in common with concurrently filed, commonly assigned, application Ser. No. 07/481,583, now U.S. Pat. No. 5,020,876 entitled STANDARD REMOTE MANIPULATOR SYSTEM DOCKING TARGET AUGMENTATION FOR AUTOMATED DOCKING

FIELD OF THE INVENTION

The present invention relates to the docking of a mobile vehicle such as a spacecraft and, more particularly, to an autonomous docking system which enable docking without external assistance or intervention.

BACKGROUND OF THE INVENTION

With the development by the National Aeronautics and Space Administration (NASA) of the Orbital Maneuvering Vehicle and the Space Station, there has been an increasing need for a completely automated rendezvous and docking system. Many future missions into space that have been planned involve rendezvous and docking scenarios that are impossible, risky or uneconomical if ground piloted control of the docking procedure is used. For example, the Mars Rover Sample Return (MRSR) mission planned by NASA will be impossible to control from Earth because of the long time delays involved. Even operations taking place in Earth orbit are subject to time delays on the order of several seconds as well as to disruptions beyond the control of the control station on Earth.

In the past, almost all vehicle docking operations have employed a human pilot to control the vehicle during the last roughly 1000 feet of the vehicle trajectory. The job of the pilot generally involves visually judging the relative position and attitude using an optical alignment sight and determining the maneuvers needed to align the vehicles based on his intuitive understanding of the dynamics involved. Although radar data and inertial measurement unit (IMU) data ar often available to the pilot so as to provide him with more accurate information about his position and attitude, the burden is on the pilot to visually estimate the attitude of the passive (target) vehicle relative to his own active (chase) vehicle. Further, some vehicles include three-axis (roll, pitch and yaw) autopilots to assist in maintaining vehicle attitude. However, these autopilots are not capable of generating the control signals necessary for translation (x, y and z -axis) maneuvers.

It will be appreciated that docking of vehicles using a human pilot involves a number of disadvantages in addition to those discussed above in connection with complex future missions now being planned. These disadvantages include the inherent limitations on the accuracy of a pilot's estimates with respect to geometrical relations, i.e., angles and distances, a lack of repeatability, and the potential for human error. Such considerations must be factored into vehicle design as well as mission planning, in order to ensure that the required margin of safety is provided and thus necessarily results in increased costs and decreased operational flexibility. For example, docking mechanisms must be over-designed in order to withstand impacts at high velocities that may occur with pilot error and the capture envelope must similarly be large. Further, a control station appropriate to the mission must be designed, constructed and tested, and it will be understood that such facilities are generally complex and costly due to the quantity and quality of the instrumentation needed to present accurate, timely information to the pilot. Further, time-consuming "pilot-in-the-loop" simulations must be performed to verify to the suitability of the information provided by the control station to the needs of the pilot in both normal and contingency situations.

It is also noted that if the mission is to be flown unmanned, a communications link must be established to provide the pilot with relevant data from the chase vehicle. Such links usually require a wide bandwidth because both high rate telemetry and video displays are normally needed by the pilot, and hence such links tend to be costly. Also, as mentioned above, the end-to-end time delay introduced by the communications link will degrade the performance of the pilot in docking the chase vehicle, thereby increasing the chances of failure. In this regard, for interplanetary missions such as the MRSR mission referred to above, the end-to-end delay is usually of such a magnitude that remotely piloted docking operations are simply not feasible.

Preliminary work this field relating to autonomous docking systems includes that described in Tietz, J. C. and Kelley, J. H.: Development of an Autonomous Video Rendezvous and Docking system, Martin Marietta Corporation, Contract No. NAS8-34679,Phase One, (Jun. 1982); Dabney, Richard W.: Automatic Rendezvous and Docking: A Parametric Study. NASA Technical Paper No. 2314, (May 1984); Tietz, J. C. and Richardson, T. E.: Development of an Autonomous Video Rendezvous and Docking System, Martin Marietta Corporation, Contract No. NAS8-34679, Phase Two, (Jun. 1983); and Tietz, J. C.: Development of an Autonomous Video Rendezvous and Docking System, Martin Marietta Corporation, Contract No. NAS8-34679, (Jan. 1984).

SUMMARY OF THE INVENTION

In accordance with the invention, an autonomous docking system is provided which enables any mobile vehicle to be docked without any outside assistance or intervention, thereby eliminating the need for either manned or teleoperated piloting of the active (chase) vehicle.

Generally speaking, the docking system of the invention involves the use of a three-point reflective docking target provided on the passive (target) vehicle and a tracking sensor, such as a monochrome video camera, on the chase vehicle. As discussed below, some of the important features include the use of an inverse-perspective projection technique in determining the relative position and attitude of the vehicles, the use of a discrete differentiation process to derive the relative rates and a closed loop position-rate feed-back control arrangement for guiding the chase vehicle and for regulating or controlling the velocity and attitude thereof.

According to a preferred embodiment of the invention, a passive-TARGET autonomous docking system is provided for generating commands for the steering and propulsion system of a chase vehicle used in providing docking of that chase vehicle with a target vehicle, the docking system comprising: an optical docking aid, for attachment to the target vehicle, the docking aid including three reflective reference points thereon; and a tracking and control system, for use on the chase vehicle, comprising: a visual tracking sensor means for determining the relative azimuth and elevation with respect to each of the reflective points and for producing electrical output signals in accordance therewith; and an autonomous docking process controller means, responsive to the output signals from the visual tracking sensor means, for producing angular and translation motion commands for the steering and propulsion system of the chase vehicle.

Preferably, the optical docking aid comprises a base plane, a central post extending outwardly from the base plane, and the three reflective reference points referred to above comprise a pair of discrete retroreflective areas located on base plane on opposite sides of the central post and a further discrete retroreflective area located at the free end of the central post.

Preferably, the tracking sensor means comprises illuminating means for illuminating the docking aid and comprising an array of laser diodes, and a video imaging device and an image processing means for computing and tracking the centroids of reflected images of the reflective reference points (areas) and for producing an output in accordance therewith. In an advantageous embodiment, the tracking sensor means further comprises signal processing means, in the form of an inverse perspective processor for processing the output of the image processing means.

The docking process controller means preferably comprises six control channels for receiving input signals relating to the relative range, roll, pitch, yaw, azimuth and elevation of the chase and target vehicles. Each control channel has different gains and limits, and each comprises filter means for filtering the corresponding electrical output signal produced by the tracking sensor means forming the input thereto so as to produce a filtered signal; means for receiving said filtered signal and for producing a rate estimate signal for the corresponding channel based on the filtered signal; means for scaling the filtered signal and the rate signal to produce scaled signals; and means for differencing the scaled signals to produce a continuous error signal. Advantageously, the docking process controller means further comprises means for limiting the continuous error signal in accordance with maximum and minimum firing times per cycle of the propulsion system of the chase vehicle. Preferably, the docking process controller means further comprises rate limiter means for receiving the scaled rate signal and for limiting the vehicle rates to predetermined limits based on the scaled rate signal. The rate limiter means advantageously comprises means for producing a command signal to reduce vehicle rates when measured vehicle rates exceed said predetermined limits.

Other features and advantages of the invention will be set forth in, or apparent from, the following detailed description of preferred embodiments of the invention.

DESCRIPTION OF THE PREFERRED EMBODIMENTS

Figure 1:
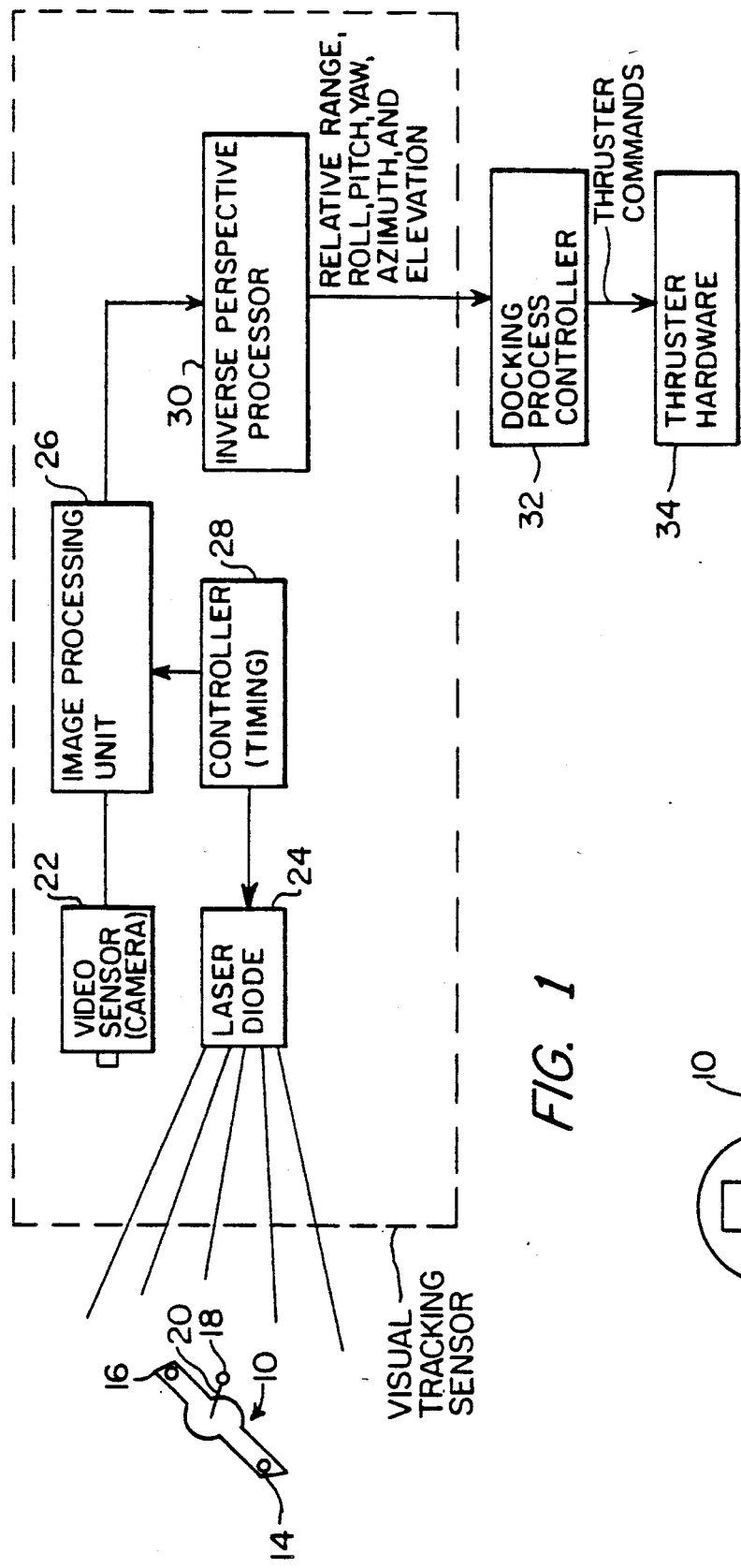
FIG. 1 is a schematic representation, partially in block diagram form, of an automated docking system in accordance with a preferred embodiment of the invention.

Referring to FIG. 1, a block diagram of the overall docking system of the invention is shown, including the basic units of the sensing or tracking subsystem. The latter is also referred to as the visual tracking sensor and is indicated in dashed lines in FIG. 1. As illustrated, the overall system includes an optical docking aid or target 10 which is attached to the target vehicle.

Figure 2:
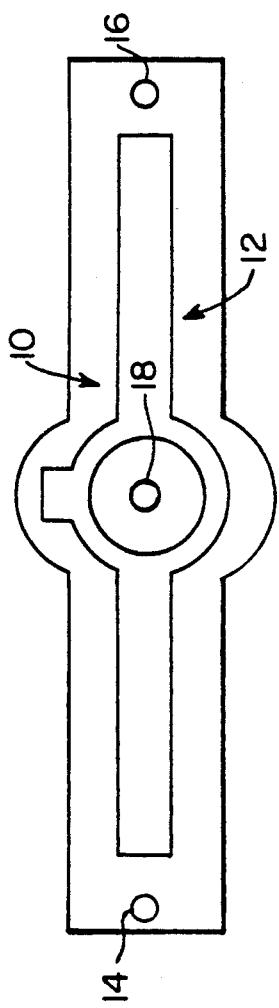
FIG. 2 is a front elevational view of the target of FIG. 1.

The front of the docking aid 10 of FIG. 1 is shown in more detail in FIG. 2, and comprises, as shown, a standard remote manipulator system (RMS) target, denoted 12, found in many present day spacecraft, augmented with three reference points 14, 16 and 18. These reference points comprise, in a preferred embodiment, one-half inch squares of retroreflective tape, with two points, 14 and 16, being disposed at the two endpoints of the centerline of the RMS target 12 and the other, point 18, at the top of a central post 20 (FIG. 1). It is noted that three reference points are the minimum needed for a six-degree-of-freedom relative state determination, i.e., to facilitate derivation of all six error signals that are provided in accordance with the invention, although a fourth point or spot could be added to provide complete knowledge of the relative vertical orientation (right-side-up versus upside-down). However, this same purpose is served by making point or spot 16 larger in the illustrated embodiment. As explained below, the attitude and position of the target 10 relative to video sensor 22 are computed from the two-dimensional coordinates of the three points or spots 14, 16 and 18 as tracked by the CID image processor system described herein below.

The video sensor 22 mentioned above is part of a data acquisition and processing subsystem which includes an array 24 of laser diodes used to illuminate the target 10, an image processing unit 26 and a controller 28 which provides timing control of the operation of the laser diode array 24. The particular tracking sensor used as sensor 22 is not critical as long as all three points or spots 14, 16 and 18 can be acquired and tracked without interruption. A simple, conventional sensor that can be used is a video imaging unit (camera), as indicated in FIG. 1, and equipped with an imaging processing unit, i.e., unit 26, capable of computing and tracking the centroids of the images of the reflector spots 14, 16 and 18. An inverse perspective processor 30 connected to the output of image processing unit 26 determines the relative azimuth and elevation angles from the point-of-view of both the chase and target vehicles, in addition to relative roll angle and range.

In a specific prototype of the invention, a charge injection device (CID) was employed as the keystone unit of the visual tracking sensor. This device is a 256×256-pixel integrated circuit manufactured by General Electric and the chip is mounted in a case that includes a thermo-electric cooler which keeps the chip at zero degrees Celsius, in order to keep noise at a minimum. The complete CID assembly also includes software controlled electronic circuitry associated with the chip that permits reading of any group of 4×4 pixels. Further circuitry includes transistors and operational amplifiers (not shown) for amplifying the signal produced by each pixel by a factor of 1000 before being sent to an analog-to-digital converter and read by the microprocessor. It is noted that the pixel values are stored in memory until all of the desired areas of the CID have been read out and then the image is processed.

The sensor used in this specific prototype is a Retro-reflector Field Tracker (RFT) and three Z-80 microprocessors are employed to control target acquisition, image processing and data output. The RFT can track up to twenty-three targets simultaneously and outputs the target data in angular terms $\Theta x$ and $\Theta y$. In the specific prototype being considered, the data is transmitted from the chase or tracking vehicle to associated ground support equipment generally at 4000 bits per second and passed out of that equipment at 19,200 bits per second, while the update rate for one entire field of data (up to twenty-three targets) is two per second. Each picture produced consists of two full read-outs of the sensor, one with the target illuminated by the laser diodes (corresponding to unit 24) and one of the background without any illumination. The background pixel values are subtracted from the illuminated picture to generate a picture with a high signal-to-noise ratio. The bright area in this picture correspond to the target spots which correspond to the desired reflections from the retro-reflective spots (i.e., the spots or points 14, 16 and 18 of FIGS. 1 and 2, and any other reflections that may occur, of the light from the laser diodes. Once the initial desired spots are found, they are tracked by finding the least squares difference between the predicted positions of the tracked spots and the centroids of the spots currently being detected. The attitude and position of the target (i.e., target 10 of FIGS. 1 and 2) relative to the visual tracking sensor are computed from the two-dimensional coordinates of the three spots (14, 16 and 18) as tracked by the CID image processor (corresponding to unit 26 of FIG. 1). The basic equations needed for these calculations are set forth in the Teitz and Kelley reference referred to above.

Figure 3:
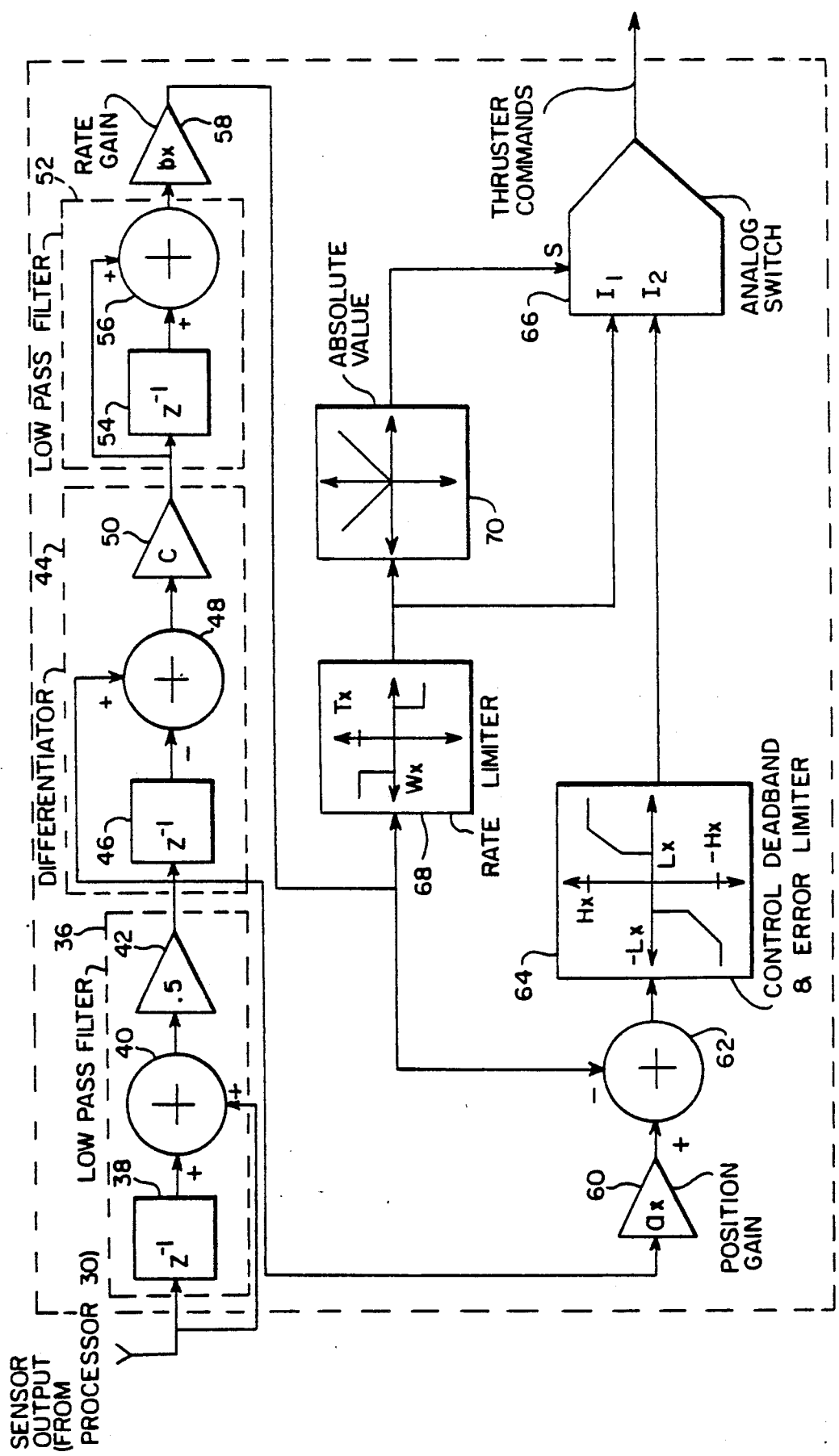
FIG. 3 is a schematic circuit diagram, partially in block form, of the docking process controller of FIG. 4.

Referring again to FIG. 1, the output signals from inverse perspective process 30 are supplied to a docking processor controller 32 which provides a sequence of operations to generate commands for the chase vehicle propulsion system. These commands have the effect of simultaneously nulling relative attitude errors, maneuvering the chase vehicle onto the docking axis and closing the relative distance between the chase vehicle and the target vehicle at a predetermined continuously decreasing RATE. The units making up a preferred embodiment of the docking process controller 32 are shown in FIG. 3. It is noted that the controller configuration shown in FIG. 3 is used for each of the six control channels (corresponding to the six output signals from inverse perspective processor 30) but with different gains and limits. A time-discrete sampled-data implementation is used, with a constant sampling rate.

As shown in FIG. 3, the sensor output is applied to a low pass filter formed by a first delay operator 38, a summing junction 40 and a multiplier (by 0.5) denoted 42, which filters the input signal to reduce the effects of random noise from the sensor and which does this by summing the past and present values of the input and then scaling, using multiplier 42, by one-half (0.5).

The resultant output signal from filter 36 applied to a differeriator 44 formed by a further delay operator 46, a further summing junction 48 and a multiplier, by C, denoted 50, which provides a rate estimate for each channel by differencing present and past values of the filtered input and then scaling by the reciprocal of the sampling rate (represented by C).

The derived rate signal is then filtered, by a low pass filter 52 formed by a delay operator 54 and a summing junction 56, in a similar manner to the raw sensor output signal.

The filtered rate and position signals are then scaled, using multipliers 58 and 60, by feedback gain coefficients "b" and "a", respectively. The filtered signals are then differenced using a summing junction 62, to provide a continuous rate error signal.

The continuous rate error signals are applied to a control deadband and error limiter circuit 64 and hard-limited in order to accommodate the minimum and maximum firing times per cycle acceptable to the propulsion system of the chase vehicle. The output of error limiter circuit 64 is applied to one input of an analog switch 66 the output of which is the thruster commands. The output of the rate gain circuit 58 is also applied to a rate limiter circuit 68 so that if the measured vehicle rates exceed a predetermined limit, the rate limit circuit 68 will apply to a further input of analog switch 66, a command signal to reduce the rates. An absolute value circuit 70 is connected between the output of rate limiter circuit 68 and the S input of analog switch 66.

Experimental results from a large-scale hardware simulation using an air bearing-mounted vehicle (in contrast to an actual spacecraft) indicate the parameter values set forth in the following table for the six sensor inputs are satisfactory:

| Input Signal | Position Gain | Rate Gain | Rate Limit | Output Signal |
|---|---|---|---|---|
| $\Theta_0$ Range | .25 | 10 | * | $e_0$ (X) |
| $\Theta_1$ Sensor Azimuth | .5 | 5 | 1.4 | $e_1$ (Y) |
| $\Theta_2$ Target Aximuth | .1 | .5 | 1.0 | $e_2$ (Yaw) |
| $\Theta_3$ Sensor Elevation | .18 | 1 | 2.8 | $e_3$ (Z) |
| $\Theta_4$ Target Elevation | .1 | .1 | 1.0 | $e_4$ (Pitch) |
| $\Theta_5$ Roll | .15 | .1 | 2.8 | $e_5$ (Roll) |

*Rate Limit = range/120 + .01

It is noted that because the geometry of the hardware involved is such that the docking target 10 is directly in front of, and aligned with, the sensor 22 whenever the docking mechanism is employed, the need for calculating an offset is eliminated and an algorithm can be used that basically drives each error to zero at a reasonable rate and maintains the error at zero. Thus, as noted above, a single control strategy that is executed independently for each axis can be used, with the equation $e_i = \theta_i a_i - w_i b_i$ being used to compute the basic error signal for each axis, wherein $e_i =$ error signal for axis "i"; $\theta_i =$ position measurement; $a_i =$ position gain; $w_i =$ rate measurement; and $b_i =$ rate gain.

Figure 4:
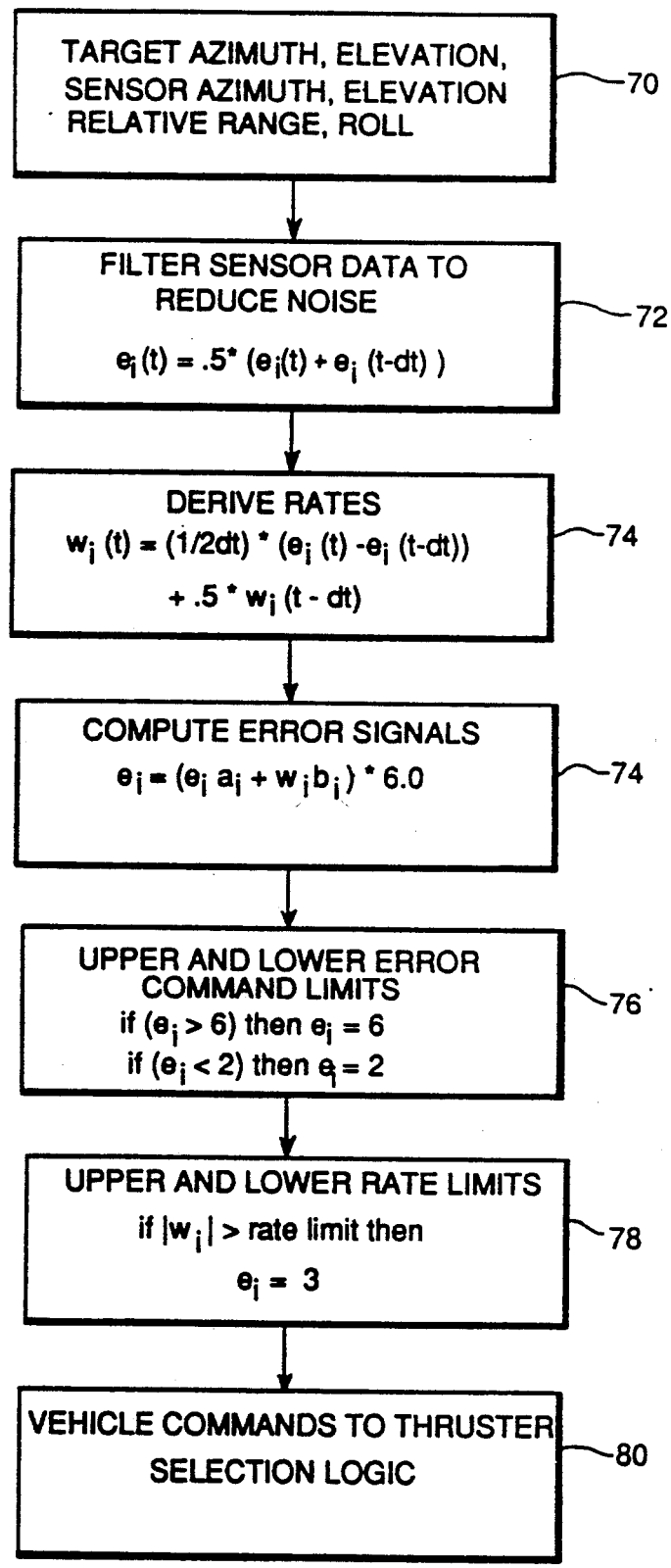
FIG. 4 is a flow chart illustrating the program flow of the controller operating program.

It is noted that in the specific prototype (air-bearing-mounted vehicle) referred above, the equation is quantized to five levels because the thrusters on the mobility base (air bearing mounted vehicle) can only be operated in 100 millisecond increments of a 500 millisecond computation cycle. In addition, a hard-limiting rate control (as provided, e.g., by rate limiter 60) will command a short (e.g., 200 millisecond) pulse in the opposing direction if the rate exceeds a predetermined maximum. Exemplary gains and rate limits used are shown in the table above, while a generalized flow chart illustrating the program flow is shown in FIG. 4. It will be appreciated that the operation steps set forth in processing blocks 72 to 80 of the flow chart of FIG. 4, including filtering of the sensor data, deriving of rates, computing error signals, and setting error command and rate limits, generally follow from the discussion above.

Figure 5:
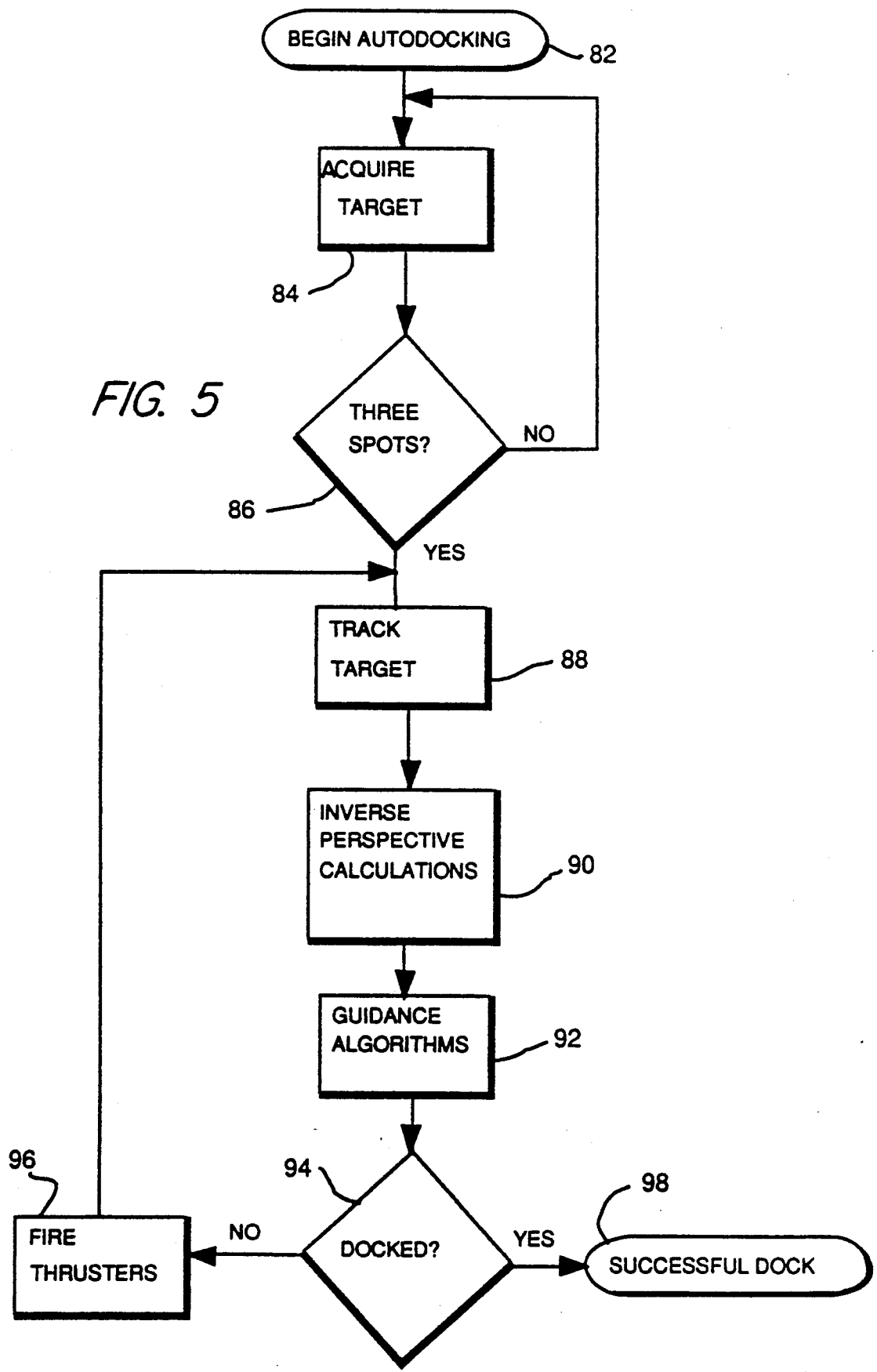
FIG. 5 is a flow chart of the overall docking operation using the system of FIG. 1.

Referring to FIG. 5, a further flow diagram is shown which illustrate the basic steps in an autodocking operation. Terminal block 82 represents the beginning of the autodocking process, which initially involves acquisition of the target 10 by the visual tracking sensor unit, as indicated by processing block 84, and determining whether the target has three "spots" corresponding to the pieces or squares of retroreflective tape 14, 16 and 18, as represented by decision diamond 86. As indicated, if a determination is made that the three spots are not present, the sensing operation continues. On the other hand, if three spots are present, the basic processing operations are initiated including full tracking of the target 10, e.g., sensing the target and processing the target image, as represented by processing block 88; preforming of the inverse perspective calculations referred to above to drive the six sensor output signals, as represented by processing block 90; and carrying out the guidance algorithms, as described above in connection with FIGS. 3 and 4, as represented by processing block 92. The actual docking procedure then takes place, with the firing of the thrusters based on the vehicle commands derived from the guidance algorithms.

In this regard, as indicated by decision diamond 94, the docking procedure is terminated at this point if the vehicle commands which provide firing of the thrusters, as represented by processing block 96, result in a successful dock. In other words, if the vehicle is determined to be docked, the procedure is terminated, as represented by terminal block 98. On the other hand, if the docking has not been completed, the thrusters are fired and the basic procedure beginning with sensing (tracking) of the target is repeated, as illustrated.

It is noted that any of several different passive target configurations can be used on optical docking aids in the system of the present invention. For example, either corner-cube reflectors or reflective tape can be used, and the size and shape of the reflectors can be varied. Further, the quantity and arrangement of the reflectors can be changed, although this would require a more powerful tracking capability and would necessitate changes in the inverse-perspective geometry processor 30. In addition, several different autonomous docking controllers (corresponding to controller 32) can be used. For example, improved performance and more flexible trajectory planning could be possible using Kalman filtering and waypoint-based goal-setting logic. In this regard, while the controller 32 described above is the simplest known that is capable of performing the task to be performed, it is to be considered representative of more sophisticated embodiments.

Thus, although the present invention has been described relative to specific exemplary embodiments thereof, it will be understood by those skilled in the art that variations and modifications can be effected in these exemplary embodiments without departing from the scope and spirit of the invention.

What is claimed is:

1. An autonomous docking system for producing commands for the steering and propulsion system of a chase vehicle used in docking of said chase vehicle with a target vehicle, said docking system comprising:
    a passive optical target for the target vehicle, said optical target comprising a plurality of reflective areas, at least one of said reflective areas being located in a different plane from that of at least two other of said reflective areas so as to provide a non-planar target; and
    a tracking sensor and process controller apparatus for the chase vehicle, said controller apparatus comprising:
    illuminating means for illuminating the target so as to cause light to be reflected from said reflective areas of the target;
    sensor means for detecting the light reflected from said target and for producing an electrical output signal in accordance with an image of the reflected light;
    signal processing means for processing said electrical output signal and for producing, based thereon, output signals relating to the relative range, roll, pitch, yaw, azimuth and elevation of the chase and target vehicles; and
    docking process controller means, responsive to the output signals produced by said signal processing means, for producing command signals for controlling the steering and propulsion system of the chase vehicle.

2. A system as claimed in claim 1 wherein said optical target comprises a base plane, a central post extending outwardly from the base plane, and a pair of discrete retroreflective areas located on said base plane on opposite sides of the central post and a further discrete retroreflective area located at the end of the central post.

3. A system as claimed in claim 2 wherein said illuminating means comprises an array of laser diodes.

4. A system as claimed in claim 2 wherein said sensor means comprises a video imaging device and an image processing means for computing and tracking the centroids of reflected images of said reflective areas.

5. A system as claimed in claim 2 wherein said signal processing means comprises an inverse perspective processor.

6. A system as claimed in claim 1 wherein said docking process controller means comprises six control channels each having different gains and limits, each of said control channels comprising filter means for filtering said output signal produced by said signal processing means to produce a filtered signal; means for receiving said filtered signal and for producing a rate estimate signal for the corresponding channel based on the filtered signal; means for scaling the filtered signal and the rate signal to produce scaled signals; and means for differencing the scaled signals to produce a continuous rate error signal.

7. A system as claimed in claim 6 wherein said docking process controller means further comprises means for limiting the continuous rate error signal in accordance with maximum and minimum firing times per cycle of the propulsion system of the chase vehicle.

8. A system as claimed in claim 7 wherein said docking process controller means further comprises rate limiter means for receiving the scaled rate signal and for limiting the vehicle rates to predetermined limits based on the scaled rate signal.

9. A system as claimed in claim 8 wherein said rate limiter means comprises means for producing a command signal to reduce said vehicle rate when said vehicle rates exceed said predetermined limit.

10. A passive autonomous docking system for generating commands for the steering and propulsion system of a chase vehicle used in providing docking of said chase vehicle with a target vehicle, said docking system comprising:
    an optical docking aid, for attachment to the target vehicle, said docking aid including three reflective reference points thereon, two of said reflective reference points being located in a base plane and the other of said reflective reference points being spaced from said base plane so as to provide a three-dimensional target; and
    a tracking and control system, for use on the chase vehicle, comprising:
        a visual tracking sensor means for determining the relative azimuth and elevation with respect to each of said reflective points and for producing electrical output signals in accordance therewith; and
        an autonomous docking process controller means, responsive to the output signals from said visual tracking sensor means, for producing angular and translation motion commands for the steering and propulsion system of the chase vehicle.

11. A system as claimed in claim 10 wherein said optical docking aid comprises said base plane, a central post extending outwardly from the base plane, and said three reflective reference points comprise a pair of discrete retroreflective areas located on said base plane on opposite sides of the central post and a further discrete retroreflective area located at the free end of the central post.

12. A system as claimed in claim 10 wherein said tracking sensor means comprises illuminating means for illuminating the docking aid and comprising an array of laser diodes.

13. A system as claimed in claim 12 wherein said tracking sensor means further comprises a video imaging device and an image processing means for computing and tracking the centroids of reflected images of said reflective reference points and for producing an output in accordance therewith.

14. A system as claimed in claim 13 wherein said tracking sensor means further comprises signal processing means for processing the output of said image processing means, said signal processing means comprises an inverse perspective processor.

15. A system as claimed in claim 10 wherein said docking process controller means comprises six control channels each having different gains and limits, each of said control channels comprising filter means for filtering a said electrical output signal produced by said tracking sensor means to produce a filtered signal; means for receiving said filtered signal and for producing a rate estimate signal for the corresponding channel based on the filtered signal; means for scaling the filtered signal and the rate signal to produce scaled signals; and means for differencing the scaled signals to produce a continuous error signal.

16. A system as claimed in claim 15 wherein said docking process controller means further comprises means for limiting the continuous error signal in accordance with maximum and minimum firing times per cycle of the propulsion system of the chase vehicle.

17. A system as claimed in claim 16 wherein said docking process controller means further comprises rate limiter means for receiving the scaled rate signal and for limiting the vehicle rates to predetermined limits based on the scaled rate signal.

18. A system as claimed in claim 17 wherein said rate limiter means comprises means for producing a command signal to reduce said vehicle rates when said vehicle rates exceed said predetermined limits.

* * * * *